(12) United States Patent
Harvey et al.

(10) Patent No.: US 7,822,736 B2
(45) Date of Patent: *Oct. 26, 2010

(54) METHOD AND SYSTEM FOR MANAGING AN INDEX ARRANGEMENT FOR A DIRECTORY

(75) Inventors: Richard H. Harvey, Ringwood East (AU); Ronald W. Ramsay, Ringwood (AU)

(73) Assignee: Computer Associates Think, Inc., Islandia, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 11/536,276

(22) Filed: Sep. 28, 2006

(65) Prior Publication Data

US 2007/0078888 A1     Apr. 5, 2007

Related U.S. Application Data

(60) Provisional application No. 60/722,729, filed on Sep. 30, 2005.

(51) Int. Cl.
*G06F 7/00* (2006.01)
*G06F 17/30* (2006.01)

(52) U.S. Cl. ........................ 707/711; 707/715
(58) Field of Classification Search ........ None
See application file for complete search history.

(56) References Cited

U.S. PATENT DOCUMENTS

| | | | |
|---|---|---|---|
| 6,199,062 B1 | 3/2001 | Byrne et al. | |
| 6,347,312 B1 | 2/2002 | Byrne et al. | |
| 6,356,892 B1 | 3/2002 | Corn et al. | |
| 6,865,576 B1 | 3/2005 | Gong et al. | 707/100 |
| 2001/0037339 A1 | 11/2001 | Harvey | 707/102 |
| 2003/0026413 A1 | 2/2003 | Brandt et al. | |
| 2003/0093583 A1 | 5/2003 | Doran et al. | |
| 2004/0078368 A1 | 4/2004 | Excoffier et al. | 707/4 |
| 2006/0173849 A1 | 8/2006 | Paul | |
| 2007/0033332 A1* | 2/2007 | Sinclair et al. | 711/103 |

FOREIGN PATENT DOCUMENTS

DE     199 54 534 A1     5/2000

(Continued)

OTHER PUBLICATIONS

PCT Notification of Transmittal of the International Search Report with attached PCT International Search Report and Written Opinion of the International Searching Authority in International Application No. PCT/US2006/038059 filed Sep. 29, 2006 (12 pages).

(Continued)

*Primary Examiner*—Uyen T. Le
(74) *Attorney, Agent, or Firm*—Baker Botts L.L.P.

(57) ABSTRACT

According to one embodiment of the invention, a method for managing an index arrangement for a directory includes storing a plurality of data values from the directory in an alternate evaluator. The alternate evaluator includes a processor operable to process a directory operation. The method also includes generating a first index corresponding to the plurality of data values, the first index comprising at least one page having a variable size. The method further includes storing a first value in the at least one page and a corresponding pointer to each occurrence of the respective data value stored in the alternate evaluator.

24 Claims, 2 Drawing Sheets

FOREIGN PATENT DOCUMENTS

| | | |
|---|---|---|
| EP | 1 313 039 A2 | 5/2003 |
| WO | WO 01/46856 A1 | 6/2001 |
| WO | WO 03/038669 A1 | 5/2003 |
| WO | WO 2005/114486 A1 | 1/2005 |

OTHER PUBLICATIONS

Elmasri, R., et al: "Fundamentals of Database Systems, Fourth Edition", 2004, pp. 455-491, XP002354081, the whole document, *Pearson Addison Wesley*.

\* cited by examiner

METHOD AND SYSTEM FOR MANAGING AN INDEX ARRANGEMENT FOR A DIRECTORY

CROSS REFERENCE TO RELATED APPLICATIONS

This application claims the benefit of priority under 35 U.S.C. §119(e) of U.S. Provisional Patent Application Ser. No. 60/722,729 entitled "Dynamic Management of Indexes in an Alternate Evaluator," which was filed on Sep. 30, 2005.

TECHNICAL FIELD OF THE INVENTION

This invention relates generally to directories, and more particularly, to a method and system for managing an index arrangement for a directory.

BACKGROUND OF THE INVENTION

A directory is a network service that provides users and applications with quick access to information. Typical uses of a directory include locating an Internet host address and storing information about users in a system having a number of interconnected machines. Example directories include Lightweight Directory Access Protocol (LDAP) directories, X.500 directories, and Directory Services Markup Language (DSML) directories. The speed and efficiency of directories are important aspects of overall directory performance. Conventional methods for increasing directory performance involve increased use of hardware, software, or a combination of both hardware and software. For example, additional CPUs, disks, memory, and directory server processes may be utilized in order to improve response times. However, although these conventional methods improve performance, they do so at a high cost.

OVERVIEW OF EXAMPLE EMBODIMENTS

According to one embodiment of the invention, a method for managing an index arrangement for a directory includes storing a plurality of data values from the directory in an alternate evaluator. The alternate evaluator includes a processor operable to process a directory operation. The method also includes generating a first index corresponding to the plurality of data values, the first index comprising at least one page having a variable size. The method further includes storing a first value in the at least one page and a corresponding pointer to each occurrence of the respective data value stored in the alternate evaluator.

Technical advantages of particular embodiments of the present invention include a method and system for managing an index arrangement for a directory that manages indexes in an alternate evaluator which has all necessary data preloaded, and is therefore capable of evaluating directory operations locally.

Another technical advantage of particular embodiments of the present invention includes a method and system for managing an index arrangement for a directory that addresses a number of techniques to increase the likelihood that the indexes are memory efficient and fast such as using fixed-depth balanced tree node index pages. Thus, the speed at which queries are evaluated is significantly increased.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Embodiments of the present invention and its advantages are best understood by referring to FIGS. 1A through 3 of the drawings, like numerals being used for like and corresponding parts of the various drawings.

Figure 1A:
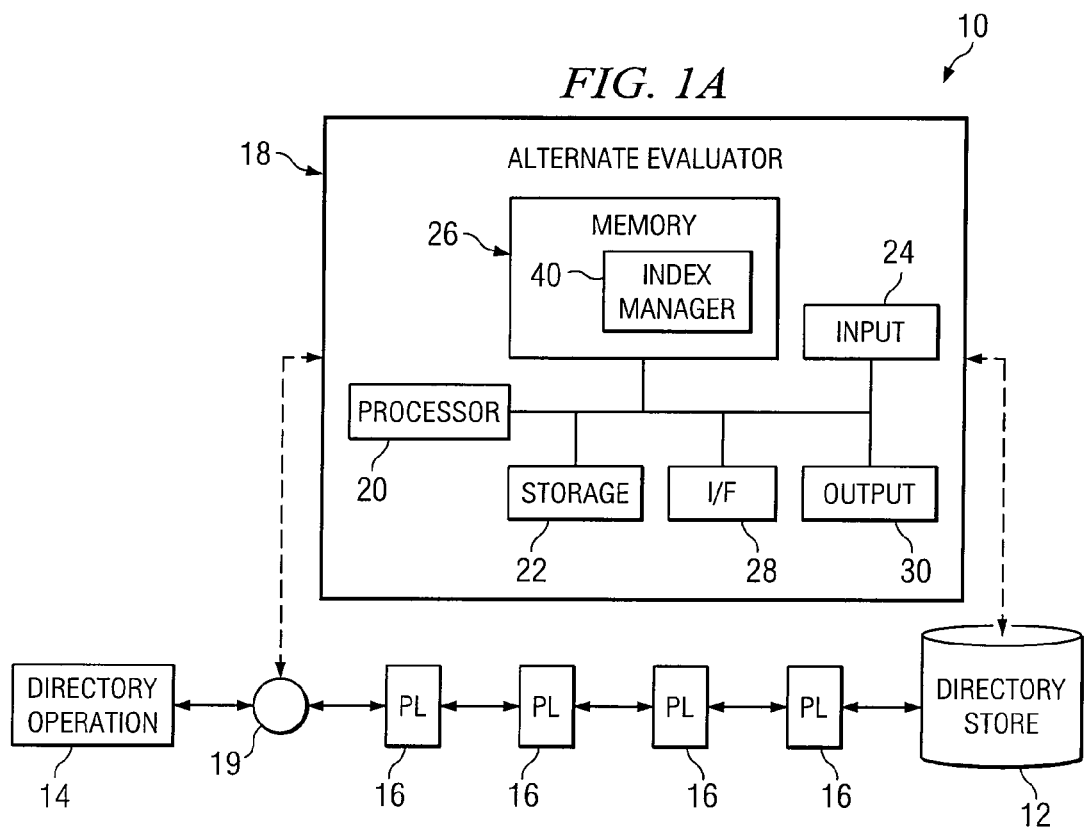
FIG. 1A is a block diagram illustrating a system for managing an index arrangement for a directory according to the teachings of the invention.

FIG. 1A is a block diagram illustrating a system 10 for managing an index arrangement for a directory according to the teachings of the invention. As shown in FIG. 1A, system 10 generally includes a directory store 12, a directory operation block 14, one or more processing layers 16, and an alternate evaluator 18. System 10 is particularly adapted for processing directory operation block 14 using alternate evaluator 18.

Directory store 12 may represent any suitable device operable to store and organize directory information. Example directories may include network operating system directories for managing logins, file-systems, and printers; security directories for single sign-on, web access management, and service management; application specific directories, such as online telephone directories, location directories, and email directories; and publishing directories, such as white pages, yellow pages, and blue pages.

Directory store 12 may be used in conjunction with any suitable protocol operable to allow users and applications to access directory data. For example, Lightweight Directory Access Protocol (LDAP) is a string based protocol that allows users and applications to access directory data. An example of a typical LDAP directory is a human resource (HR) directory wherein each entry may represent an employee record. Directory entry objects may have attributes. For example, in the case of the HR directory, the employee's last name, first name, email address, job title, office location, and phone number may represent various attributes of an entry. Each directory entry may be uniquely identified by a distinguished name (DN), which is a unique identifier for each directory entry. Generally speaking, a full distinguished name (DN) is similar to an absolute path to a file. For example, a naming attribute for an entry may be an email address for an employee. In the example of a file system, the naming attribute is similar to a file name. To get the DN for the full path to the entry, the naming attribute may be appended to the full sequence of directory nodes that serve as ancestors to the naming attribute. Therefore, an employee's email address may be expressed as a naming attribute for an entry, and the DN refers to the full path to the entry. Other examples of suitable protocols include, but are not limited to, X.500 and Directory Services Markup Language (DSML), which is a variant of Extensible Markup Language (XML).

Directory operation block 14 may refer to any suitable process for accessing directory data. For example, directory operation block 14 may be a query operation. Query operations may refer to any suitable process for retrieving information from a directory. Query operations may include "read" for reading data, "list" for listing data, "search" for searching for data and "compare" for comparing data. As another example, directory operation block 14 may be an update operation. Update operations may refer to any suitable process for updating information in a directory. Update operations may include "add" for adding data, "remove" for deleting data, "modify" for changing data and "ModifyDN" for changing the distinguished name associated with data. However, the present disclosure contemplates many types of directory operations. Various embodiments may include, some, all, or none of the enumerated directory operations.

Processing layer 16 may refer to any suitable functional component operable to execute a process on behalf of directory operation block 14. For example, processing layer 16 may be used to decode protocols used by directory operation block 14, converting directory operation block 14 into standard protocols such as SQL, interpreting the SQL, executing the SQL, handling disk cache buffers, and utilizing an operating system to retrieve data from directory store 12. As another example, processing layer 16 may be software for authentication and routing.

Alternate evaluator 18 may represent any suitable device operable to process directory operation block 14. For example, a switch 19 may be provided at a point along the data path that connects one or more processing layers 16. In the illustrated embodiment, switch 19 is placed before the first processing layer 16. Switch 19 may examine directory operation block 14 to determine whether alternate evaluator 18 may be able to process directory operation block 14. In making this determination, switch 19 may rely on local configurations, for example, programmed logic that resides locally within switch 19. Alternate evaluator 18 may process directory operation block 14 by accessing indexed data stored on a local data store. One example of alternate evaluator 18 is described in pending U.S. application Ser. No. 11/270,794 entitled "Method and System for Configuring a Supplemental Directory" filed Nov. 9, 2005, which is incorporated by reference herein. Additional details of other examples of alternate evaluator 18 are described in more detail below.

In various embodiments of the invention, one or more processing layers 16 may increase the time required to respond to directory operation block 14. For example, one or more processing layers 16 may be software for checking a directory structure, checking a schema, controlling access to directory store 12, and optimizing operation filters. As a result, one or more processing layers 16, and accessing directory store 12 directly, may create a bottleneck in the directory system.

According to one embodiment of the invention, a system and method are provided that reduce the time needed to process directory operations. This is effected by loading alternate evaluator 18 with data values from directory store 12 and managing indexes for the data values. In this way, one or more processing layers 16 may be avoided, significantly reducing the time required to process directory operation block 14. Additional details of example embodiments of the invention are described in greater detail below in conjunction with portions of FIG. 1A, FIG. 1B, FIG. 2, and FIG. 3.

According to the illustrated embodiment of the invention, alternate evaluator 18 includes a processor 20, a storage device 22, an input device 24, a memory device 26, a communication interface 28, an output device 30, and an index manager 40.

Processor 20 may refer to any suitable device operable to execute instructions and manipulate data to perform operations for alternate evaluator 18. Processor 22 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information. Input device 24 may include, for example, a keyboard, mouse, graphics tablet, joystick, light pen, microphone, scanner, or other suitable input device.

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for alternate evaluator 18, send output from alternate evaluator 18, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows alternate evaluator 18 to communicate to other devices. For example, communication interface 28 may include any suitable software operable to access data from various devices such as directory store 12, a file system, and input device 24. Communication interface 28 may communicate with various devices to read and/or write data such as directory data from directory store 12, receive directory operation block 14, receive interactive commands from an administrator, and read configuration data from a file system at runtime. Communication interface 28 may include one or more ports, conversion software, or both.

Output device 30 may refer to any suitable device operable for displaying information to a user. Output device 30 may include, for example, a video display, a printer, a plotter, or other suitable output device.

Index manager 40 may refer to any suitable logic embodied in computer-readable media, and when executed on processor 20, that is operable to manage indexes for data stored on alternate evaluator 18. In the illustrated embodiment of the invention, index manager 40 resides in memory device 26. In other embodiments of the invention, index manager 40 may reside in other storage devices operable to store and facilitate retrieval of data and instructions. In operation, index manager 40 may be executed on processor 20, store and retrieve data in memory device 26, receive and send data through communication interface 28, and receive and display data through input device 24 and output device 30. Additional details of example embodiments of index manager 40 are described in greater detail below in conjunction with portions of FIG. 1B.

Figure 1B:
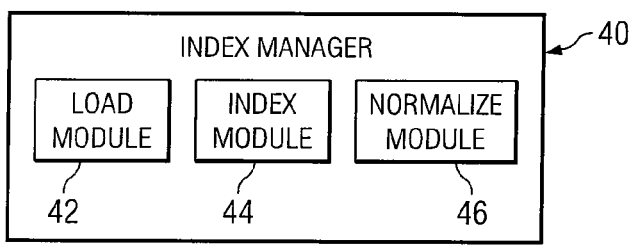
FIG. 1B is a block diagram illustrating an example index manager of the system of FIG. 1A in accordance with an embodiment of the present invention.

FIG. 1B is a block diagram illustrating an example index manager 40 of system 10 of FIG. 1A in accordance with an embodiment of the present invention. Index manager 40 may include various modules operable to perform various functions, including a load module 42, an index module 44, and a normalize module 46. According to one embodiment of the invention, index manager 40 may build and manage an integrated memory-based indexing system to actual data loaded from directory store 12.

Figure 2:
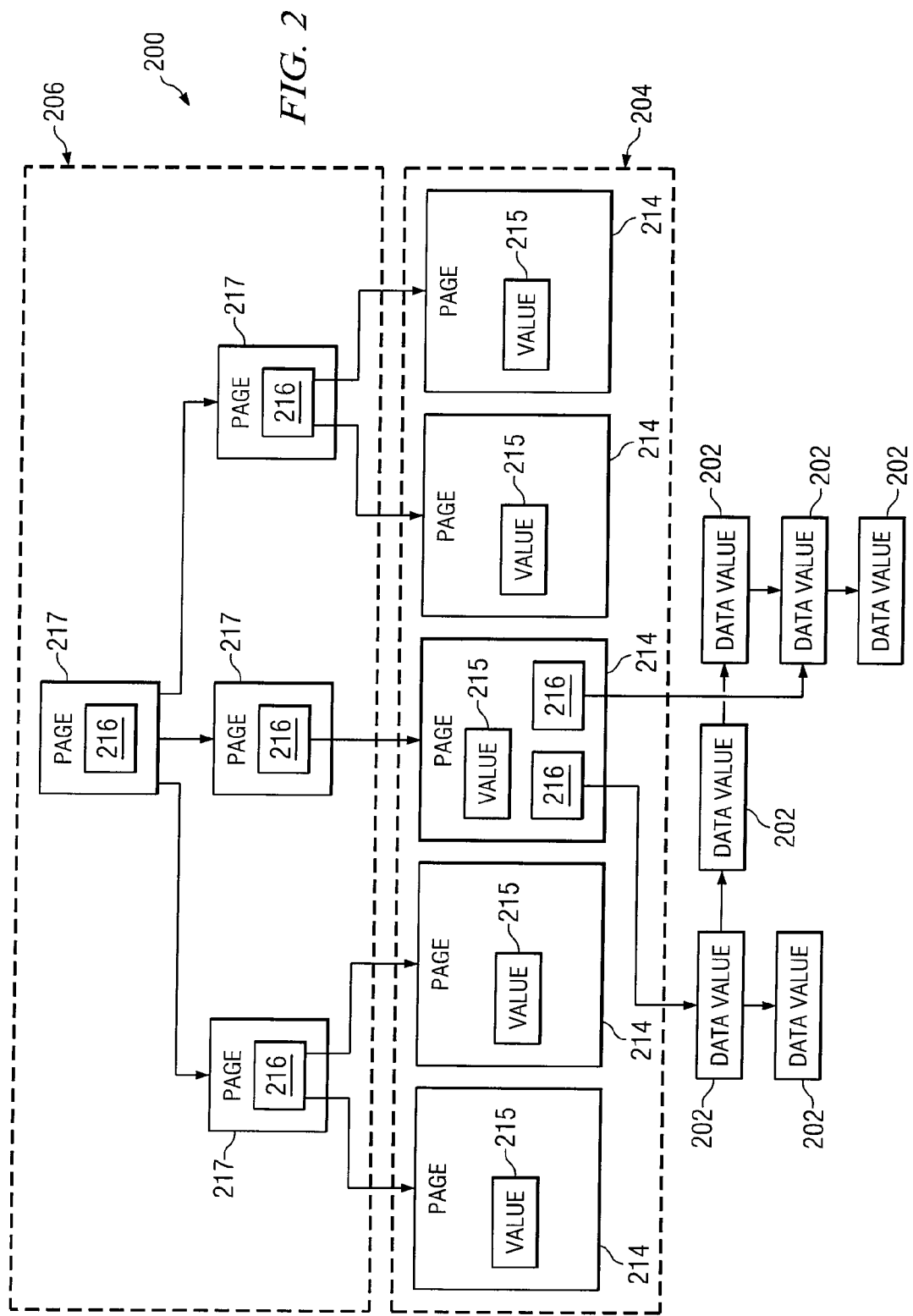
FIG. 2 is a block diagram illustrating an example indexing system of FIG. 1A, according to an embodiment of the invention.

FIG. 2 is a block diagram illustrating an example indexing system 200 of system 10 of FIG. 1A, according to an embodiment of the invention. Indexing system 200 may be generated by index manager 40 of FIG. 1B. According to the illustrated embodiment, indexing system 200 generally includes one or more data values 202, a first index 204, and a second index 206.

According to one embodiment of the invention, load module 42 stores, in alternate evaluator 18, one or more data values 202 from directory store 12. According to some embodiments of the present invention, memory device 26 of alternate evaluator 18 may be pre-loaded with data values 202 by load module 42 prior to the use of alternate evaluator 18. The pre-loading of alternate evaluator 18 may allow alternate evaluator 18 to evaluate directory operations without having to access directory store 12. Additionally, by pre-loading alternate evaluator 18, alternate evaluator 18 may be able to achieve maximum performance on startup, unlike conventional caches that may require time to prepare data.

Index module 44 may provide links to data values 202 by generating first index 204, according to one embodiment of the invention. First index 204 includes at least one page 214, and each page 214 contains a value 215 and one or more corresponding pointers 216 to each occurrence of value 215 as data value 202 in memory. In other embodiments, pointer 216 may be an indicator such as a page number, slot number, entry number, or any other number indicative of a reference.

According to one embodiment of the invention, index module 44 may store a counter in page 214. The counter may maintain the number of pointers 216 on page 214. Thus, the counter may be used for query optimization and management of page 216. For example, a counter may indicate a frequency of values present in directory store 12. The counter may indicate that there are 10 entries with a first name value of "Jakob," and the counter may indicate that there are 400 entries with a last name value of "Johnson." Thus, for an arbitrary query for a user with the first name "Jakob" and a last name of "Johnson," query optimization may be effected by examining the counters for first name, and last name, and determining that searching for a match for "Jakob" using a first name index would be more efficient than searching for a match for "Johnson." Thus, the query optimizer may complete the query by searching the 10 entries found for "Jakob" and then finding amongst those entries with the last name of "Johnson." The size of each page 214 may be variable in size as diagrammatically indicated by the graphical representation of the size of pages 214 in FIG. 2. Preferably, the size of page 214 corresponds to the number of pointers 216 in page 214. However, in other embodiments, the page size may be of a pre-determined size if required by defining a fixed number of pointers 216.

According to one embodiment of the invention, index module 44 may receive progressive updates to maintain accuracy of data values 202 in directory store 12. An update operation to directory store 12 may include, for example, adding an entry with a name and a set of attributes, removing an entry including any of its associated names, attributes and attribute values, modifying an entry to add and remove an attribute and attribute values, and renaming an entry to change an entry's name by adding, removing or selecting existing attribute values. Data structures may be retrieved from directory store 12 and used to progressively update data stored in alternate evaluator 18.

According to one embodiment of the invention, index module 44 may maintain a filtered set of data to keep the data in alternate evaluator 18 properly synchronized with directory store 12. A filter may be used by index module 44 to control data automatically loaded and/or removed from alternate evaluator 18. For example, a filter may specify that all employees with an particular attribute, such as status, with a particular value, such as "active," should be loaded in alternate evaluator 18. Therefore, when certain data changes state, such as when an employee status attribute is set from "active" to "inactive," index module 44 may update the data automatically in alternate evaluator 18 to reflect the changed state and remove the employee data from alternate evaluator 18 based on the filter. In so doing, embodiments of the present disclosure may be able to automatically synchronize data based on a filter, facilitate the storage of a high occupancy of indexes, minimize the number of comparisons required to execute a query, and provide multiple index types.

According to one embodiment of the invention, index module 44 may improve the performance indexing system 200 by generating second index 206. Second index 206 includes a group of pages 217, each page 217 containing one or more corresponding pointers 216 to other pages 217 or pages 214 of first index 204.

In particular embodiments of the invention, value 215 may not be stored in second index 206 because resolving pointer 216 from second index 206 will find value 215 in first index 204. For example, index module 44 may find value 215 in first index 204 using a binary search algorithm in second index 206. A binary search algorithm is a technique for finding a particular value by ruling out half of the data at each step. A binary search finds the median, makes a comparison to determine whether the desired value comes before or after it, and then searches the remaining half in the same manner. Thus, in order to implement a binary search algorithm, index module 44 may sort second index 206 to accommodate finding the median of second index 206.

According to one embodiment of the invention, index module 44 may implement second index 206 as a structured index, such as a B-tree. A B-tree is a tree data structure that may be used by indexes to facilitate searching. B-trees allow for amortized logarithmic time insertions and deletions of tree elements. A B-tree may have one level, two levels, or more than two levels and may have one or more pages 217. In particular embodiments of the invention, having a B-tree with a particular number levels offers several advantages. For example, one advantage of a B-tree with two levels is that searches may be improved when it is known that data values may be accessed two levels down in a tree. For example, the data may be accessed directly using a double de-reference pointer. Having a particular number of levels in a B-tree may simplify the logic for accessing data values and may optimize data queries. Other technical advantages of the present invention will be readily apparent to one skilled in the art.

Normalize module 46 may maintain syntax normalized data values 202 so that multiple units of data do not need to individually store the same sets of values, according to one embodiment of the invention. Syntax normalized values may be created from data values 202 that are indexed. Normalizing values may remove the variation that is for allowed by the matching rules for the syntax for that value. For example, where an email address attribute for an entry is "joe@yahoo.com" a CaseIgnoreString matching rule may be used to create the syntax normalized value "JOE@YAHOO.COM" where the CaseIgnoreString matching rule is defined as removing leading and trailing spaces, replacing multiple consecutive spaces with a single space and converting the string into upper case. However, the present disclosure contemplates many types of normalizing operations. Various embodiments may include, some, all, or none of the enumerated normalizing operations.

Normalize module 46 may balance second index 206 across one or more pages to organize the number of pointers 216 in pages 217, according to one embodiment of the invention. Organizing the number of pointers 216 in pages 217 balances memory with efficiency to optimize second index 206. Generally, it is better for memory efficiency that the pages are well-utilized. However, there is a cost associated with well-utilized pages because if a page becomes full, it may necessary to split pages which can add to the time for an update. Pages may be balanced over a particular percentage to balance the occupancy of pages. For example, balancing over two pages will achieve 50% occupancy. Balancing over three pages will achieve 66% occupancy. Balancing over four pages will give 75% occupancy. Balancing over five pages will give 80% occupancy.

Figure 3:
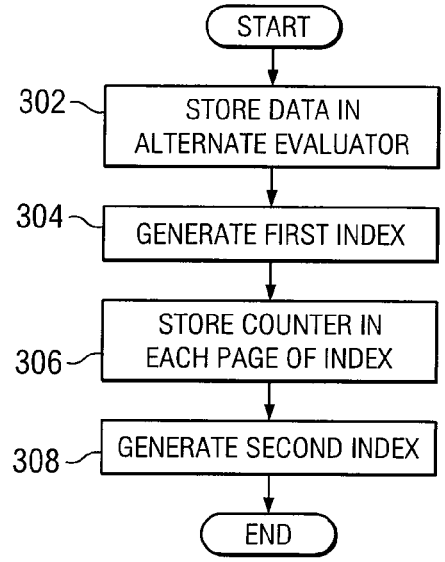
FIG. 3 is a flow chart illustrating example acts associated with a method for managing an index arrangement for a directory.

FIG. 3 is a flow chart illustrating example acts associated with a method for managing an index arrangement for a directory. The example acts may be performed by index manager 40, as discussed above with reference to FIG. 1A and FIG. 1B, or by any other suitable device. At step 302, data values from a directory may be stored in the alternate evaluator. According to some embodiments of the present invention the alternate evaluator may be pre-loaded with data values to evaluate directory operations without having to access the directory. Additionally, by pre-loading the alternate evaluator, it may be able to achieve maximum performance on startup, unlike conventional caches that may require time to prepare data.

At step 304, a first index may be generated for the data values stored at step 302. The first index includes at least one page, and each page contains a value and one or more corresponding pointers to each occurrence of the value as a data value in memory. In other embodiments, each pointer may be an indicator such as a page number, slot number, entry number, or any other number indicative of a reference.

At step 306, a counter may be stored in each page. The counter may maintains the number of pointers at each page. Thus, the counter may be used for query optimization and management of the page. For example, the size of each page may be variable in size, corresponding to the number of pointers in the page. However, in other embodiments, the page size may be of a pre-determined size if required by defining a fixed number of pointers.

At step 308, a second index may be generated. The second index includes a group of pages, and each page contains one or more corresponding pointers to other pages of the first index. In particular embodiments of the invention, values may not be stored in the second index because a resolving pointer from the second index will find the value in the first index. For example, a binary search algorithm may be used in the second index. In particular embodiments of the invention, the second index may be implemented as a structured index, such as a B-tree.

Thus, the present disclosure addresses a number of techniques to enhance directory performance such as using multipage balancing to get high occupancy in pages, reducing duplication, using variable page sizes in index pages, and simplifying management of pages by keeping a count of pointers in each page. As a result, the speed at which directory operations may be evaluated is significantly increased. Certain embodiments of the present invention can be used in any directory system. The system may operate in accordance with various standards including X.500, LDAP, and DSML.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for processing directory operations, comprising:
retrieving a plurality of data values from a directory;
storing the plurality of data values in electronic memory;
generating a first index corresponding to the plurality of data values, the first index comprising at least one page having a variable size;
storing a first value in the at least one page and a corresponding pointer to each occurrence of the respective data value stored;
receiving a directory operation;
deciding whether to evaluate the directory operation using an evaluator;
in response to deciding not to evaluate the directory operation using the evaluator, evaluating the directory operation by passing the directory operation through one or more processing layers in a data path; and
in response to deciding to evaluate the directory operation using the evaluator, evaluating the directory operation based on stored data values in the index using the evaluator.

2. The method of claim 1, wherein the first value in the at least one page comprises a syntax normalized value.

3. The method of claim 1, further comprising:
storing a counter in the at least one page, wherein the counter is indicative of a total number of pointers in the page; and
resizing the page based on the counter.

4. The method of claim 1, further comprising generating a second index, the second index comprising at least one page, the at least one page comprising one or more pointers from the second index to the first index.

5. The method of claim 4, further comprising adding a second level to the second index.

6. The method of claim 4, further comprising balancing the second index to increase the occupancy ratio of the second index by organizing the second index to provide a particular number of pointers at each page.

7. The method of claim 4, further comprising sorting the second index to support a binary search algorithm.

8. The method of claim 4, further comprising storing the second index as a B-tree.

9. A system for processing directory operations, comprising:
a processor; and
a storage device embodying a program of instructions operable, when executed on the processor, to:
retrieve a plurality of data values from a directory;
store the plurality of data values in electronic memory;
generate a first index corresponding to the plurality of data values, the first index comprising at least one page having a variable size;
store a first value in the at least one page and a corresponding pointer to each occurrence of the respective data value stored;
receive a directory operation;
decide whether to evaluate the directory operation using an evaluator;
in response to deciding not to evaluate the directory operation using the evaluator, evaluate the directory operation by passing the directory operation through one or more processing layers in a data path; and in response to deciding to evaluate the directory operation using the evaluator, evaluate the directory operation based on stored data values in the index using the evaluator.

10. The system of claim 9, wherein the first value in the at least one page comprises a syntax normalized value.

11. The system of claim 9, wherein the program of instructions is further operable to:
store a counter in the at least one page, wherein the counter is indicative of a total number of pointers in the page; and
resize the page based on the counter.

12. The system of claim 9, wherein the program of instructions is further operable to generate a second index, the second index comprising at least one page, the at least one page comprising one or more pointers from the second index to the first index.

13. The system of claim 12, wherein the program of instructions is further operable to add a second level to the second index.

14. The system of claim 12, wherein the program of instructions is further operable to balance the second index to increase the occupancy ratio of the second index by organizing the second index to provide a particular number of pointers at each page.

15. The system of claim 12, wherein the program of instructions is further operable to sort the second index to support a binary search algorithm.

16. The system of claim 12, wherein the program of instructions is further operable to store the second index as a B-tree.

17. Logic encoded in tangible media, the logic being operable, when executed on a processor, to:
retrieve a plurality of data values from a directory;
store the plurality of data values in electronic memory;
generate a first index corresponding to the plurality of data values, the first index comprising at least one page having a variable size;
store a first value in the at least one page and a corresponding pointer to each occurrence of the respective data value stored;
receive a directory operation;
decide whether to evaluate the directory operation using an evaluator;
in response to deciding not to evaluate the directory operation using the evaluator, evaluate the directory operation by passing the directory operation through one or more processing layers in a data path; and
in response to deciding to evaluate the directory operation using the evaluator, evaluate the directory operation based on stored data values in the index using the evaluator.

18. The logic of claim 17, wherein the first value in the at least one page comprises a syntax normalized value.

19. The logic of claim 17, wherein the logic is further operable to:
store a counter in the at least one page, wherein the counter is indicative of a total number of pointers in the page; and
resize the page based on the counter.

20. The logic of claim 17, wherein the logic is further operable to generate a second index, the second index comprising at least one page, the at least one page comprising one or more pointers from the second index to the first index.

21. The logic of claim 20, wherein the logic is further operable to add a second level to the second index.

22. The logic of claim 20, wherein the logic is further operable to balance the second index to increase the occupancy ratio of the second index by organizing the second index to provide a particular number of pointers at each page.

23. The logic of claim 20, wherein the logic is further operable to sort the second index to support a binary search algorithm.

24. The logic of claim 20, wherein the logic is further operable to store the second index as a B-tree.

* * * * *